United States Patent
Manta et al.

(10) Patent No.: US 10,875,409 B2
(45) Date of Patent: Dec. 29, 2020

(54) POWER TRANSMISSION CONTROL DEVICE

(71) Applicant: AISIN AW CO., LTD., Anjo (JP)

(72) Inventors: Hideto Manta, Nishio (JP); Hiroki Inoue, Nishio (JP); Mitsutoshi Kamiya, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 7 days.

(21) Appl. No.: 16/471,599

(22) PCT Filed: Nov. 28, 2017

(86) PCT No.: PCT/JP2017/042488
§ 371 (c)(1),
(2) Date: Jun. 20, 2019

(87) PCT Pub. No.: WO2018/123392
PCT Pub. Date: Jul. 5, 2018

(65) Prior Publication Data
US 2020/0171963 A1 Jun. 4, 2020

(30) Foreign Application Priority Data
Dec. 27, 2016 (JP) .................. 2016-253213

(51) Int. Cl.
*B60L 15/20* (2006.01)
*B60L 50/16* (2019.01)
(Continued)

(52) U.S. Cl.
CPC ............ *B60L 15/2054* (2013.01); *B60K 6/36* (2013.01); *B60K 6/42* (2013.01); *B60K 6/547* (2013.01);
(Continued)

(58) Field of Classification Search
None
See application file for complete search history.

(56) References Cited

U.S. PATENT DOCUMENTS

| 8,577,527 B2 * | 11/2013 | Fukumura ........... F02D 41/0215 |
| | | 701/22 |
| 9,038,493 B2 * | 5/2015 | Iwasaki ................... F16H 3/083 |
| | | 74/335 |
| 2018/0119802 A1 * | 5/2018 | Takeuchi ................ F16H 61/68 |

FOREIGN PATENT DOCUMENTS

| JP | 2009-210108 A | 9/2009 |
| JP | 2016-124336 A | 7/2016 |

OTHER PUBLICATIONS

U.S. Appl. No. 16/471,597, filed Jun. 20, 2019, Manta et al.
(Continued)

*Primary Examiner* — Dirk Wright
(74) *Attorney, Agent, or Firm* — Buchanan Ingersoll & Rooney PC

(57) ABSTRACT

A power transmission control device includes a first rotation shaft, a first power source to adjust rotation speed of the first rotation shaft, a second rotation shaft interlocked with an axle, a first switching mechanism to connect/disconnect switching between the first and second rotation shafts, a third rotation shaft, a second power source to adjust rotation speed of the third rotation shaft, and a second switching mechanism to connect/disconnect switching between the third rotation shaft and the second rotation shaft. At least one switching mechanism of the first switching mechanism and the second switching mechanism is a dog clutch type, and reliably and stably performs the connection switching thereof. A control stores information on a rotation phase of the first/third rotation shafts. At least one of the first/second
(Continued)

switching mechanisms is held in a connected state, and the rotation phase is adjusted based on stored information at the connection switching.

2 Claims, 7 Drawing Sheets

(51) Int. Cl.
  *B60K 6/36* (2007.10)
  *B60K 6/42* (2007.10)
  *B60K 6/547* (2007.10)
  *B60K 17/06* (2006.01)
  *B60W 10/06* (2006.01)
  *B60W 10/08* (2006.01)
  *B60W 10/10* (2012.01)
  *B60W 20/30* (2016.01)
  *F16H 59/42* (2006.01)
(52) U.S. Cl.
  CPC .............. *B60K 17/06* (2013.01); *B60L 50/16* (2019.02); *B60W 10/06* (2013.01); *B60W 10/08* (2013.01); *B60W 10/10* (2013.01); *B60W 20/30* (2013.01); *F16H 59/42* (2013.01)

(56) References Cited

OTHER PUBLICATIONS

U.S. Appl. No. 16/471,763, filed Jun. 20, 2019, Shimizu et al.
U.S. Appl. No. 16/471,800, filed Jun. 20, 2019, Inoue et al.
International Search Report (Form PCT/ISA/210) dated Feb. 13, 2018, by the Japanese Patent Office in corresponding International Application No. PCT/JP2017/042488. (4 pages).
Notification of Transmittal of Translation of the International Preliminary Report on Patentability (Form PCT/IB/338 and PCT/IB/373) dated Jul. 11, 2019 and the Written Opinion of the International Searching Authority (Form PCT/ISA/237) dated Feb. 13, 2018, by the International Bureau of WIPO in corresponding International Application No. PCT/JP2017/042488. (10 pages).

\* cited by examiner

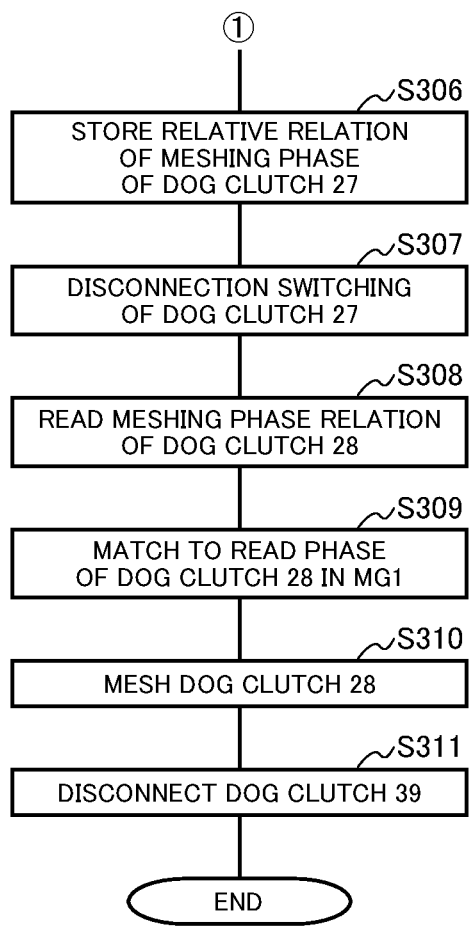

POWER TRANSMISSION CONTROL DEVICE

TECHNICAL FIELD

The present invention relates to a power transmission control device.

BACKGROUND ART

A power transmission control device disclosed in Patent Literature 1 that adjusts a rotation phase at a time of switching from a disconnected state to a connected state of a dog clutch, using information on the rotation phase detected by a resolver incorporated in each of a plurality of motor generators is known.

Moreover, the power transmission control device illustrated in patent literature 2 as a device using the same method is known. The power transmission control device of Patent Literature 2 includes a first rotation shaft, a first power source provided to be able to adjust a rotation speed of the first rotation shaft, a second rotation shaft that rotates in conjunction with an axle, a first switching mechanism that performs connection and disconnection switching of power transmission between the first rotation shaft and the second rotation shaft, a third rotation shaft different from the first rotation shaft and the second rotation shaft, and a second power source provided so that the rotation speed of the third rotation shaft is adjustable.

The power transmission control device further includes a control unit that controls operations of the first power source and the second power source and connection and disconnection switching operation of the first switching mechanism, a first rotation phase detection unit that detects a rotation phase of the first rotation shaft, and a third rotation phase detection unit that detects the rotation phase of the third rotation shaft. The first switching mechanism is a dog clutch type. The power of the third rotation shaft is transmitted to the second rotation shaft.

When switching the dog clutch from the disconnected state to the connected state, the control unit performs the phase adjustment by the first power source or the second power source so that the dog clutch can be set in the connected state, on the basis of the information on the rotation phase detected by the first rotation phase detection unit and the third rotation phase detection unit.

CITATION LIST

Patent Literature

Patent Literature 1: JP 2009-210108 A
Patent Literature 2: JP 2016-124336 A

SUMMARY OF INVENTION

Technical Problem

In the power transmission control device of Patent Literature 2, since the third rotation shaft and the second rotation shaft are always connected to allow power transmission and the energy loss is large, it is desirable to provide a second switching mechanism that performs the connection and disconnection switching of the power transmission between the third rotation shaft and the second rotation shaft.

However, simply by providing the second switching mechanism, when the second switching mechanism is disconnected, a relation of the rotation phase in which the second switching mechanism is in the connected state becomes unclear, and there is a risk of occurrence of trouble.

An object of the present invention is to provide a power transmission control device that includes a first rotation shaft, a first power source capable of adjusting a rotation speed of the first rotation shaft, a second rotation shaft which rotates in conjunction with an axle, a first switching mechanism which performs connection and disconnection switching of power transmission between the first rotation shaft and the second rotation shaft, a third rotation shaft, a second power source capable of adjusting a rotation speed of the third rotation shaft, and a second switching mechanism which performs connection and disconnection switching between the third rotation shaft and the second rotation shaft, in which at least one switching mechanism of the first switching mechanism and the second switching mechanism is a dog clutch type, and it is possible to reliably and stably perform switching of the at least one switching mechanism to the connected state.

Solution to Problem

In order to solve the above problems, provided is a power transmission control device including: a first rotation shaft; a first power source provided to be able to adjust a rotation speed of the first rotation shaft; a second rotation shaft which rotates in conjunction with an axle; a first switching mechanism which performs connection and disconnection switching of power transmission between the first rotation shaft and the second rotation shaft; a third rotation shaft different from the first rotation shaft and the second rotation shaft; a second power source provided to be able to adjust a rotation speed of the third rotation shaft; a second switching mechanism which performs connection and disconnection switching of power transmission between the third rotation shaft and the second rotation shaft; a control unit which controls connection and disconnection switching operation of the first switching mechanism and the second switching mechanism and operations of the first power source and the second power source; a storage unit; a first rotation phase detection unit which detects a rotation phase of the first rotation shaft; and a third rotation phase detection unit which detects a rotation phase of the third rotation shaft, wherein at least one switching mechanism of the first switching mechanism and the second switching mechanism is a dog clutch type, and the control unit performs a simultaneous connection process of operating to switch both the first switching mechanism and the second switching mechanism to a connected state when releasing the connection of the at least one switching mechanism, a phase storage process of storing the rotation phase of the first rotation shaft detected by the first rotation phase detection unit and the rotation phase of the third rotation shaft detected by the third rotation phase detection unit in the storage unit, after executing the simultaneous connection process, and a disconnection process of operating to switch the at least one switching mechanism to a disconnected state, while maintaining at least the other switching mechanism in the connected state, after executing the phase storage process.

The control unit may perform a phase adjustment process of controlling the first power source or the second power source on the basis of the rotation phase of the first rotation shaft and the rotation phase of the third rotation shaft stored in the storage unit by the phase storage process to adjust the rotation phase of the first rotation shaft and the rotation phase of the third rotation shaft, when the at least one switching mechanism is switched from the disconnected state to the connected state, and a connection process of connecting the at least one switching mechanism after executing the phase adjustment process.

Advantageous Effects of Invention

It is possible to reliably and stably perform switching of the dog clutch type switching mechanism to the connected state since connection and disconnection switching of the first switching mechanism and the second switching mechanism, detection of the detected rotation phase and storage of the storage unit are performed at an appropriate timing so that necessary information of the rotation phase is not unclear.

BRIEF DESCRIPTION OF DRAWINGS

FIG. 7 is a flowchart illustrating a second half in the process at the time of gear change switching by the first switching mechanism.

DESCRIPTION OF EMBODIMENTS

Figure 1:
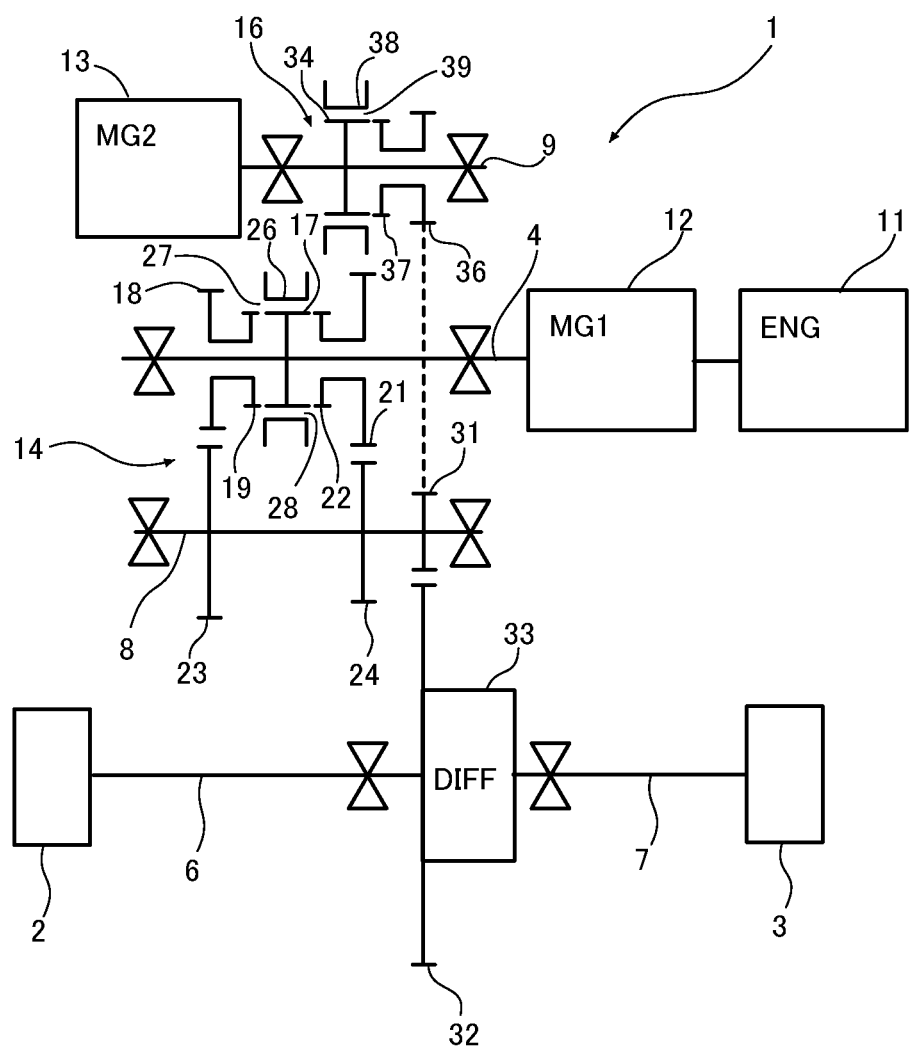
FIG. 1 is a power transmission configuration diagram of a power transmission control device to which the present invention is applied.
Figure 2A:
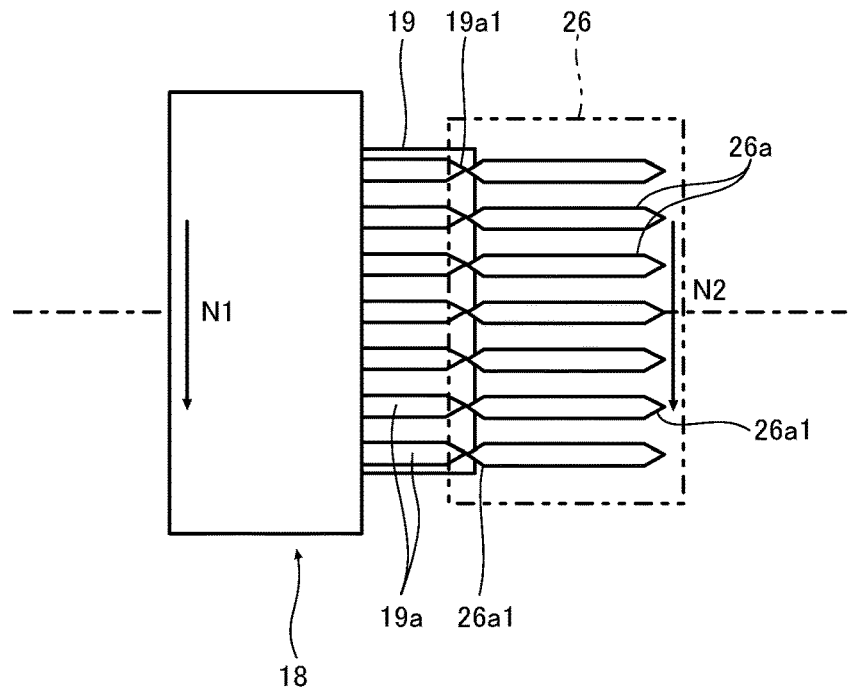
FIG. 2(A) is an enlarged view of a low-speed input gear and a sleeve in a state in which an up-lock occurs.
Figure 2B:
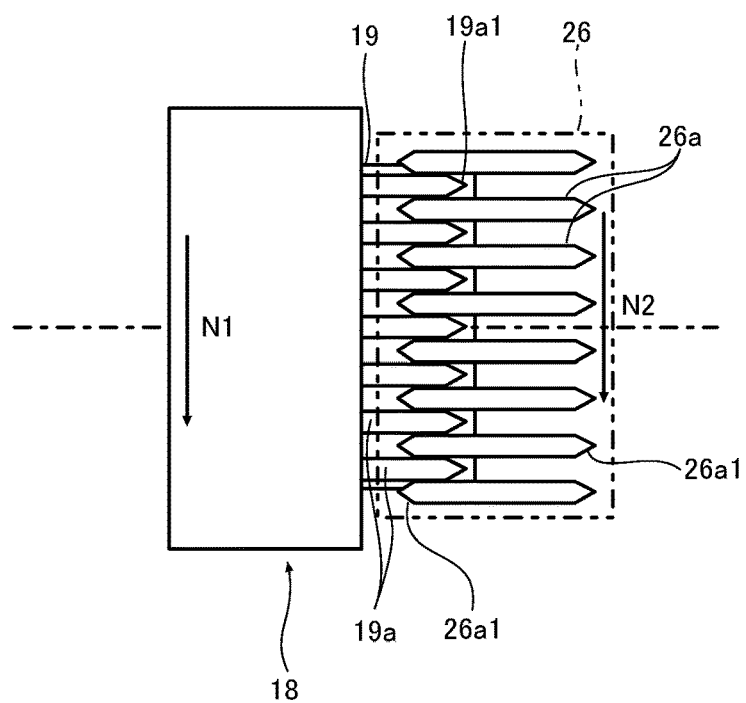
FIG. 2(B) is an enlarged view of a spline-coupled low-speed input gear and a sleeve.

FIG. 1 is a power transmission configuration diagram of a power transmission control device to which the present invention is applied, FIG. 2(A) is an enlarged view of a low-speed input gear and a sleeve in a state in which an up-lock occurs, and FIG. 2(B) is an enlarged view of a spline-coupled low-speed input gear and the sleeve. A power transmission control device 1 is mounted on a vehicle such as a private vehicle and controls the power transmission to a pair of right and left wheels 3 and 2 of the vehicle.

The power transmission control device 1 includes a first rotation shaft 4, a second rotation shaft 8 that rotates in synchronization with axles 6 and 7, a third rotation shaft 9 different from the first rotation shaft 4 and the second rotation shaft 8, an engine 11 provided to output the power to the first rotation shaft 4 to be able to adjust the rotation speed of the first rotation shaft 4, a first motor generator 12 provided to be able to adjust the rotation speed of the first rotation shaft 4, and a second motor generator 13 provided to output power to the third rotation shaft 9 to be able to adjust the rotation speed of the third rotation shaft 9.

Furthermore, the power transmission control device 1 includes a first switching mechanism 14 that performs connection and disconnection switching of power transmission between the first rotation shaft 4 and the second rotation shaft 8, and a second switching mechanism 16 that performs connection and disconnection switching of the power transmission between the third rotation shaft 9 and the second rotation shaft 8.

The engine 11 and the first generator 12 are examples of a first power source, and the second motor generator 13 is an example of a second power source. Further, the first motor generator 12 and the second motor generator 13 can adjust the rotation speed with higher accuracy than the engine 11.

The first switching mechanism 14 includes a hub 17 mounted to rotate integrally with the first rotation shaft 4, a pair of input gears 18 and 21 mounted on the first rotation shaft 4 in a free rotation state, a pair of output gears 23 and 24 mounted to rotate integrally with the second rotation shaft 8, and a sleeve 26 mounted to rotate integrally on the outer periphery of the hub 17 and slidable in the axial direction of the first rotation shaft 4.

One of the pair of input gears 18 and 21 is a small diameter low-speed input gear 18, and the other thereof is a large diameter high-speed input gear 21. The hub 17 is disposed between the pair of input gears 18 and 21. One of the pair of output gears 23 and 24 is a large diameter low-speed output gear 23 always meshing with the low-speed input gear 18, and the other thereof is a small diameter high-speed output gear 24 always meshing with the high-speed input gear 21.

Pieces 19 and 22 protruding toward the hub 17 are integrally formed on the input gears 18 and 21, respectively. In other words, the hub 17 is disposed so as to be sandwiched between the pair of pieces 19 and 22 and is adjacent to both of them.

Spline teeth 26a are formed at equal intervals, respectively, so that the outer periphery of the hub 17 and the inner periphery of the sleeve 26 are spline-coupled. Spline teeth 19a are also formed on the outer periphery of each of the pieces 19 and 22 at mutually equal intervals to be able to spindle-couple with the inner periphery of the sleeve 26. Incidentally, FIG. 2 illustrates a state of the low-speed input gear 18 and the sleeve 26, but the state of the high-speed input gear 21 and the sleeve 26 is also the same.

When the sleeve 26 moves to slide toward the low-speed input gear 18, the outer periphery of the piece 19 of the low-speed input gear 18 and the inner periphery of the sleeve 26 are spline-coupled, and the low-speed input gear 18 including the piece 19 rotates integrally with the hub 17 and the sleeve 26. This state is a low-speed state in which the power of the first rotation shaft 4 is transmitted to the second rotation shaft 8 at low speed.

When the sleeve 26 moves to slide toward the high-speed input gear 2l, the outer periphery of the piece 22 of the high-speed input gear 21 and the inner periphery of the sleeve 26 are spline-coupled, and the high-speed input gear 21 including the piece 22 rotates integrally with the hub 17 and the sleeve 26. This state is a high-speed state in which the power of the first rotation shaft 4 is transmitted to the second rotation shaft 8 at high speed.

When the sleeve 26 moves to slide to an engagement release position between the adjacent pair of pieces 19 and 22, the sleeve 26 is not spline-coupled to either of the pair of pieces 19 and 22, and the power of the first rotation shaft 4 enters an engagement release state in which the power of the first rotation shaft 4 is not transmitted to the second rotation shaft 8.

That is, the first switching mechanism 14 also performs gear change switching in the connected state as well as the connection and disconnection switching. Further, by the aforementioned configuration, the hub 17, the pair of pieces 19 and 22 and the sleeve 26 constitute dog clutches 27 and 28 for connecting and disconnecting the power by spline coupling and coupling release. In other words, the first switching mechanism 14 is a dog clutch type switching mechanism.

An engagement completion position at which the sleeve 26 is completely spline-coupled with the piece 19 of the low-speed input gear 18 is respectively set to be close to both ends within the sliding range of the sleeve 26. When the sleeve 26 is caused to slide to be closer to the end than the engagement completion position in the sliding range, there is a pressing completion state in which the sleeve 26 is pressed against a stopper (not illustrated).

Between the engagement completion position and the engagement release position within the sliding range of the sleeve 26, an engagement start position which is an engagement start state in which the sleeve 26 and the spline teeth 19a and 26a of the pieces 19 and 22 are in contact with each other and power is not transmitted is set.

Incidentally, although the hub 17 and the sleeve 26 are always spline-coupled, the sleeve 26 and the pieces 19 and 22 are not always spline-coupled, and switching is performed from one state to the other state of the released state of the spline-coupling and the spline-coupled state, and from the other state to one state thereof. For this reason, in order for the pieces 19 and 22 and the sleeve 17 to be smoothly spline-coupled in connection with the sliding of the sleeve 26, chamfers 19a1 and 26a1 pointed in a wedge shape are formed at the facing tips of the spline teeth 19a and 26a of both, respectively.

Even if one spline tooth 19a1 is not accurately located in a tooth groove formed between the other spline teeth 19a1 and 19a1, it is possible to mesh both by utilizing the action of the chamfers 19a1 and 26a1.

However, when trying to make the sleeve 26 slide to the engagement completion position, in a state in which the phases of the pieces 19 and 22 and the sleeve 26 completely coincide with each other, the circumferential position of the chamfer 19a1 coincides with and the rotation phase is the same, as illustrated in FIG. 2(A), an up-lock in which the tips of the chamfers 19a1 and 26a1 abut against each other occurs to interfere the engagement.

In order to prevent the occurrence of the up-lock and complete the engagement smoothly as illustrated in FIG. 2(B), in a state in which the rotation phases of the pieces 19 and 22 and the sleeve 26 do not completely coincide with each other so that the pressing action of the chamfers 19a1 and 26a1 occurs, it is necessary to make the sleeve 26 slide to the engagement completion position.

Further, when a rotation speed difference $\Delta N$ between a rotation speed N1 of the pieces 19 and 22 and a rotation speed N2 of the sleeve 26 is large, since the rotation phase relation between the pieces 19 and 22 and the sleeve 26 is basically unstable, it is difficult to smoothly perform the slide operation to the engagement completion position of the pieces 19 and 22. On the other hand, when the rotation speed difference $\Delta N$ is set to 0, the up-lock occurs when the rotation phases of the pieces 19 and 22 and the sleeve 26 completely coincide with each other.

That is, the control of the rotation speed is executed so that the rotation speed difference $\Delta N$ is maintained within an optimal range which is a sufficiently smaller value than the rotation speed N1 and the rotation speed N2 and larger than 0.

Incidentally, at this time, as long as the rotation phase relation between the pieces 19 and 22 and the sleeve 26 can be accurately grasped, it is possible to smoothly perform switching of the dog clutches 27 and 28 from the disconnected state to the connected state, without using a synchronization means such as a synchronizer ring. Furthermore, if the accuracy is improved, it is not necessary to provide the chamfers 19a1 and 26a1.

The control of the rotation phase of the first switching mechanism 14 is mainly performed by the engine 11 or the first motor generator 12, but if the second switching mechanism 16 is in the connected state, the second motor generator 13 may be accessorily used.

Figure 3:
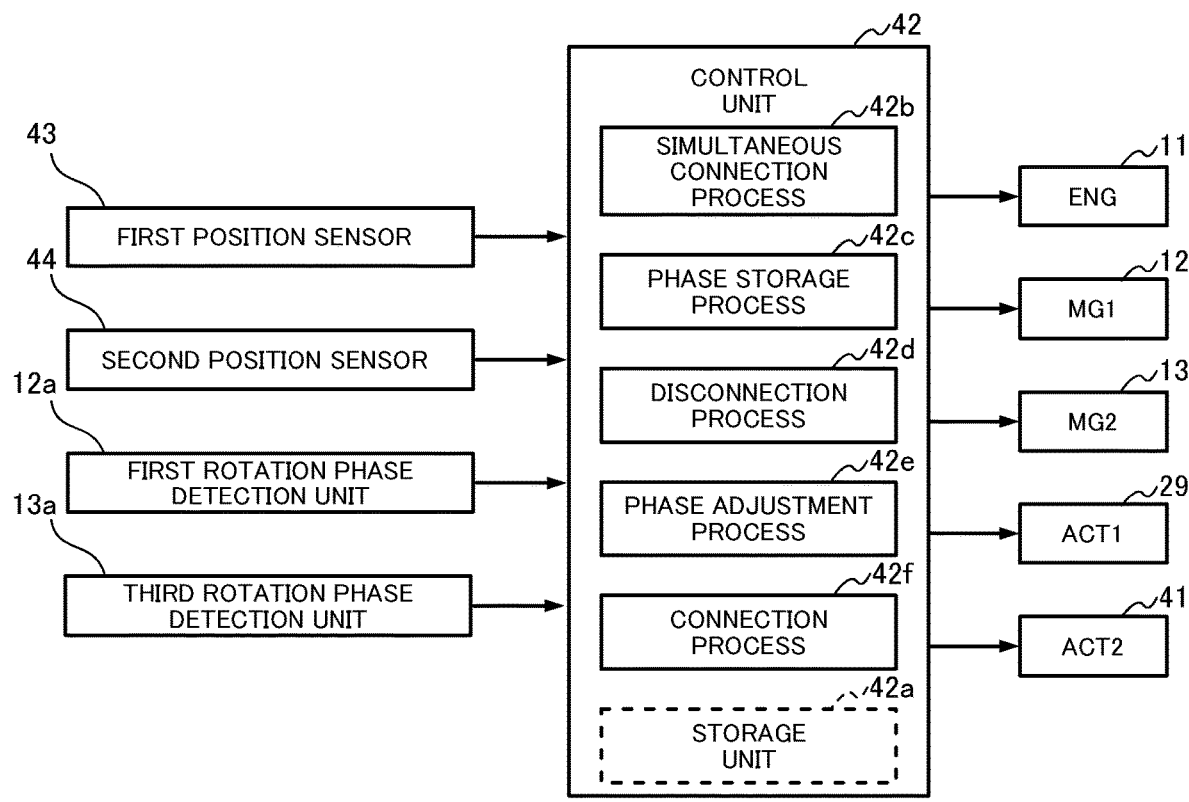
FIG. 3 is a block diagram illustrating a configuration of a control unit.

Incidentally, the slide operation of the sleeve 26 is performed by a first actuator 29 illustrated in FIG. 3.

The power of the second rotation shaft 8 is transmitted to a differential mechanism 33 via a drive gear 31 and a driven gear 32. The differential mechanism 33 distributes the power from the second rotation shaft 8 to the right and left axles 7 and 6. Incidentally, the right and left wheels 3 and 2 may be the rear wheels or front wheels of the vehicle.

The second switching mechanism 16 includes a hub 34 mounted on the third rotation shaft 9 to rotate integrally, a gear 36 supported on the third rotation shaft 9 in a free rotation state and always meshing with the drive gear 31, and a sleeve 38 mounted on the outer periphery of the hub 34 to rotate integrally and slidable in an axial direction of the third rotation shaft 9. The gear 36 integrally has a piece 37 protruding toward the hub 34.

The hub 34, the gear 36 including the piece 37, and the sleeve 38 are configured to be the same as or substantially the same as the hub 17, the input gears 18 and 21 including the pieces 19 and 22, and the sleeve 26. Therefore, the piece 37 and the sleeve 38 constitute a dog clutch 39. That is, the second switching mechanism 16 is also a dog clutch type switching mechanism, similarly to the first switching mechanism 14.

When the sleeve 38 is moved to slide to the piece 37 adjacent to the hub 34, the sleeve 38 is spline-coupled to both the hub 34 and the piece 37, the connection switching of the dog clutch 39 is performed, and the state is switched to a motor operation state in which the power of the third rotation shaft 9 rotationally driven by the second motor generator 13 is transmitted to the second rotation shaft 8.

When the sleeve 38 is moved to slide to a position away from the gear 36, the sleeve 38 is spline-coupled with only the hub 34, disconnection switching of the dog clutch 39 is performed, and the state is switched to a motor non-operation state in which the power of the third rotation shaft 9 rotationally driven by the second motor generator 13 is not transmitted to the second rotation shaft 8.

Incidentally, even when the connection switching of the dog clutch 39 is performed, as in the case of the pieces 19 and 22 and the sleeve 26, it is necessary to accurately grasp the rotation phase relation. As long as the rotation phase relation between them can be accurately grasped, the connection switching of the dog clutch 39 can be smoothly performed, without using a synchronization means such as a synchronizer ring.

The control of the rotation phase of the first switching mechanism 16 is mainly performed by the second motor generator 13. However, if the first switching mechanism 14 is in a connected state, the engine 11 or the first motor generator 12 may be accessorily used.

Further, the operation of making the sleeve 38 slide is performed by a second actuator 41 illustrated in FIG. 3.

By the way, in FIG. 1, if the rotation phase of the first rotation shaft 4, the rotation phase of the second rotation shaft 8, and the rotation phase of the third rotation shaft 9 can always be grasped by a rotation sensor such as an encoder, the connection switching of the dog clutches 27, 28 and 39 can be smoothly performed.

However, in this case, the number of rotation sensors increases, the cost is high, and the disadvantages are large. In this example, smooth execution of the connection switching is achieved by a first rotation phase detection unit 12*a* illustrated in FIG. 3 that detects the rotation phase of the first rotation shaft 4 and a third rotation phase detection unit 13*a* illustrated in FIG. 3 that detects the rotation phase of the third rotation shaft 9. Incidentally, the first rotation phase detection unit 12*a* is formed by a resolver incorporated in the first motor generator 12, and the third rotation phase detection unit 13*a* is formed by a resolver incorporated in the second motor generator 13.

The control of connection and disconnection switching of the dog clutches 27, 28 and 39 is performed by a control unit 42 illustrated in FIG. 3.

FIG. 3 is a block diagram illustrating the configuration of the control unit. The control unit 42 is formed by one microcomputer or a plurality of microcomputers interconnected by CAN or the like. Incidentally, one of the plurality of microcomputers forming the control unit 42 may be an ECU which is a dedicated microcomputer for controlling the engine 2. The control unit 42 has a storage unit 42*a* formed by a ROM or the like. Incidentally, the storage unit 42*a* may be an external type rather than a built-in type, as long as data can be read and written by the control unit 42.

The first rotation phase detection unit 12*a* and the third rotation phase detection unit 13*a*, a first position sensor 43 for detecting the slide position of the sleeve 26, and a second position sensor 44 for detecting the slide position of the sleeve 38 are connected to an input side of the control unit 42. The first position sensor 43 and the second position sensor 44 are types of position detection unit capable of detecting the connected state, the disconnected state, and the like of the dog clutches 27, 28 and 39.

The engine 11, the first motor generator 12, the second motor generator 13, the first actuator 29 and the second actuator 41 are connected to an output side of the control unit 42, respectively.

The first actuator 29 and the second actuator 41 include an electric motor or the like for generating a driving force for performing the slide operation of the sleeves 26 and 38. Generally, a shock absorbing means such as a damper mechanism is provided between the electric motor and the sleeves 26 and 38 to reduce a gear change shock or the like by the shock absorbing means. However, in this example, since the gear change shock is reduced by appropriate adjustment of the rotation phase, it is not essential to provide the shock absorbing means.

When the control unit 42 receives a shift command caused by a change in traveling condition or a driver's operation by a receiving unit (not illustrated), the control unit 42 performs the optimal control of the rotation phase by the engine 11, the first motor generator 12 or the second motor generator 13 on the basis of the detection result of the first rotation phase detection unit 12*a* and the third rotation phase detection unit 13*a*, and performs the slide operation of the sleeves 26 and 39 by the first actuator 29 or the second actuator 41.

Specifically, during traveling of the vehicle, the control unit 42 performs switching to the high-speed state or the low-speed state by the first switching mechanism 14 on the basis of information such as a traveling state, an access operation or a brake operation from the driver, and selects one of an engine traveling mode in which switching to the motor non-operation state is performed by the second switching mechanism 16, and a motor traveling mode in which switching to a neutral state is performed by the first switching mechanism 14 and switching to the motor operation state is performed by the second switching mechanism 16.

When switching from one of the engine traveling mode and the motor traveling mode to the other, or from the other to one thereof, at least one of the first switching mechanism 14 and the second switching mechanism 16 is held in a state of transmitting the power, so that both the first switching mechanism 14 and the second switching mechanism 16 are not in the state of cutting off the power. At this time, the information of the rotation phase acquired by the third rotation phase detection unit 13*a* and the first rotation phase detection unit 12*a* is sequentially stored in the storage unit 42*a*. The information on the past rotation phase stored in the storage unit 42*a* is read as necessary, and is used for the control of adjusting the rotation phase by the engine 11, the first motor generator 12, or the second motor generator 13 so that connection switching of the dog clutches 27, 28, and 39 becomes possible.

Specifically, the connection switching of one of the dog clutches 27, 28, and 39 of one of the switching mechanisms 14 and 16 in the first switching mechanism 14 and the second switching mechanism 16 is performed, and the disconnection switching of one of the dog clutches 27, 28, and 39 of the other of the switching mechanisms 14 and 16 is performed, thereby performing the mode switching.

In performing such motor switching, the control unit 42 first performs a simultaneous connection process 42*b* of performing the connection switching of one of the dog clutches 27, 28, and 39 which is a target of connection switching in the one of the switching mechanisms 14 and 16 by a means to be described later.

After executing the simultaneous connection process 42*b*, the control unit 42 performs a phase storage process 42*c* of storing the rotation phase of the first rotation shaft 4 detected by the first rotation phase detection unit 12*a* and the rotation phase of the third rotation shaft 9 detected by the third rotation phase detection unit 13*a* in the storage unit 42*a*. Incidentally, after performing the disconnection switching of one of the dog clutches 27, 28, and 39 which is the target of the disconnection switching, the information of the rotation phase stored in this way is used to adjust the rotation phase in the case of performing connection switching again.

After executing the phase storage process 42*c*, the control unit 42 performs a disconnection process 42*d* of performing the disconnection switching of one of the dog clutches 27, 28, and 39 which is the target of the disconnection switching of the other of the switching mechanisms 14 and 16, in a state of holding the connected state of one of the dog clutches 27, 28, and 39 subjected to the connection switching by the simultaneous connection process 42*b*.

Subsequently, a control of performing the connection switching of the first switching mechanism 14 or the second switching mechanism 16 by the connection switching of one of the dog clutches 27, 28, and 39 will be described. First, when the dog clutches 27, 28, and 39 which are the targets of connection switching are subjected to the most recent disconnection switching, the control unit 42 performs a phase adjustment process 42*e* which acquires information on the rotation phase of the first rotation shaft 4 and the rotation phase of the third rotation shaft 9 stored by the phase storage process 42*c* from the storage unit 42*a*, and subsequently adjusts and controls the rotation phase of the first rotation shaft 4 and the third rotation shaft 9, using the engine 11, the first motor generator 12, or the second motor generator 13, by using the information on the rotation phase.

After the execution of the phase adjustment process 42e, the control unit 42 executes a connection process 42f of performing the connection switching of the dog clutches 27, 28, and 39 which are the targets of the connection switching.

Further, the information on the rotation phase is sequentially stored in the storage unit 42a, and since the quality of the result of the phase adjustment process 42e based on the process content of the phase adjustment process 42e can also be detected, the information is machine-learned, and the accuracy of the phase adjustment process 42e or the connection process 42f may be further enhanced.

Next, specific process contents of the control unit 42 will be described on the basis of the flowcharts of FIGS. 4 to 7.

Figure 4:
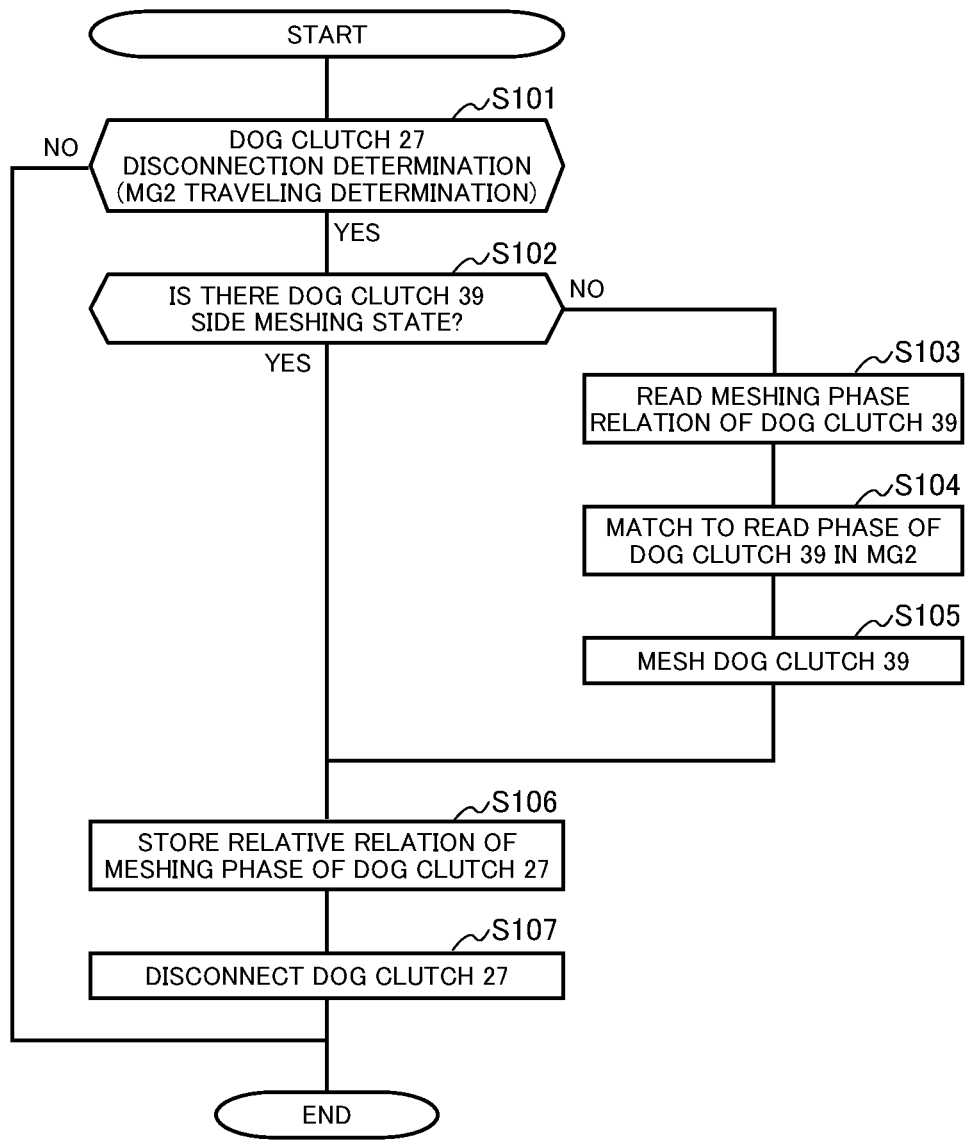
FIG. 4 is a process flowchart of mode switching from an engine traveling mode to a motor traveling mode.

FIG. 4 is a process flowchart of mode switching from the engine traveling mode to the motor traveling mode. The process illustrated in FIG. 4 is periodically executed for each predetermined interval. The process starts from step S101. In step S101, it is checked whether the switching condition to the motor traveling mode is satisfied. If the condition is not satisfied, the process is ended, and meanwhile, if the condition is satisfied, the process proceeds to step S102. Incidentally, as described above, the operation of the driver, the traveling state of the vehicle, and the like are used in the determination of the switching condition.

In step S102, it is checked by the second position sensor 44 whether the dog clutch 39 of the second switching mechanism 16 is in the connected and disconnected state. If it is in the disconnected state, the process proceeds to step S103. In step S103, when the dog clutch 39 is subjected to disconnection switching most recently, information on the past rotation phase of the first rotation shaft 4 and the third rotation shaft 9 stored in the storage unit 42a is acquired from the storage unit 42a, and the process proceeds to step S104.

In step S104, the rotation phases of the first rotation shaft 4 and the third rotation shaft 9 are adjusted and controlled by the second motor generator 13, using the information on the rotation phase acquired in step S103, so that the dog clutch 39 can be subjected to connection switching, and the process proceeds to step S105.

Incidentally, the processes of step S103 and step S104 correspond to the phase adjustment process 42e.

In step S105, the connection switching of the dog clutch 39 is performed by the second actuator 41, and the process proceeds to step S106.

Incidentally, the process of step S105 corresponds to the connection process 42f, and also corresponds to the simultaneous connection process 42b of setting to the connected state of both the first switching mechanism 14 and the second switching mechanism 16.

In step S106, in order to use a relation between the rotation phase of one of the dog clutches 27 and 28 which are the targets of disconnection switching in the first switching mechanism 14 in the future, the rotation phase of the rotation shaft 4 is detected by the first rotation phase detection unit 12a, the rotation phase of the third rotation shaft 9 is detected by the third rotation phase detection unit 13a, the information on these rotation phases is stored in the storage unit 42a, and the process proceeds to step S107.

Incidentally, the process of step S106 corresponds to the phase storage process 42c.

In step S107, the disconnection switching of one of the dog clutches 27 and 28 which are the targets of the disconnection switching is performed by the first actuator 29, the first switching mechanism 14 is in the state of cutting off the power, and the process is ended. In step S102, when the dog clutch 39 of the second switching mechanism 16 is in the connected state, the process proceeds to step S106. Incidentally, in the illustrated example, in step S106 and step S107, the dog clutch 27 is a disconnection switching target, and the engine traveling mode of the low-speed state is switched to the motor traveling mode. However, of course, there is also a case where the engine traveling mode of the high-speed state is switched to the motor traveling mode, and in this case, the dog clutch 28 becomes the disconnection switching target in step S106 and step S107.

Figure 5:
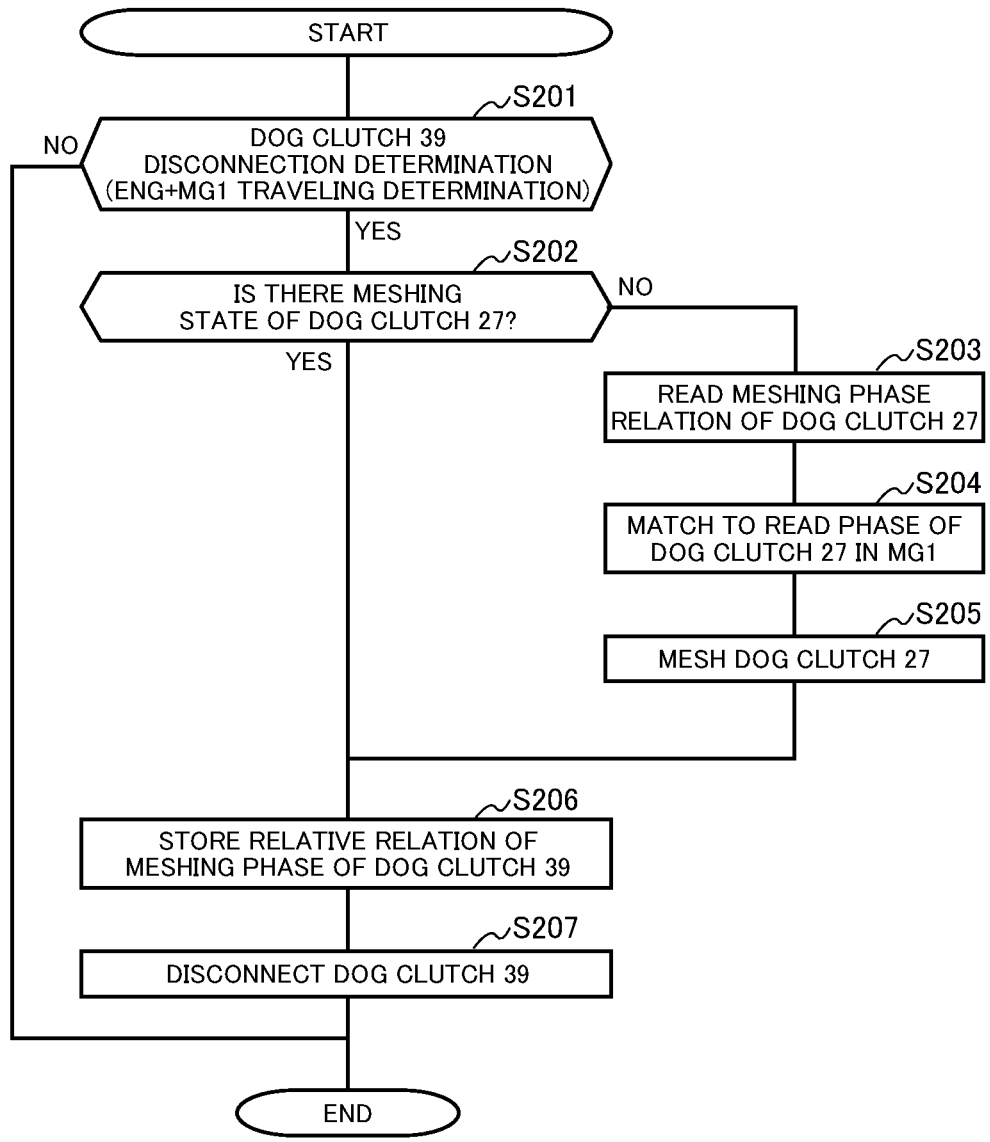
FIG. 5 is a process flowchart of mode switching from the motor traveling mode to the engine traveling mode.

FIG. 5 is a process flow diagram of mode switching from the motor traveling mode to the engine traveling mode. The process illustrated in FIG. 5 is periodically executed for each predetermined interval. The process starts from step S201. In step S201, it is checked whether the switching condition to the engine traveling mode is satisfied. If the condition is not satisfied, the process is ended, and meanwhile, if the condition is satisfied, the process proceeds to step S202. Incidentally, the operation of the driver, the traveling state of the vehicle, and the like are also used in the determination of the switching condition.

In step S202, it is checked whether one of the dog clutches 27 and 28 which is the connection target in the first switching mechanism 14 is in the disconnected state, and if it is in the disconnected state, the process proceeds to step S203. Incidentally, the dog clutches 27 and 27 other than the connection target in the first switching mechanism 14 are naturally in the disconnected state. Further, in the illustrated example, the dog clutch 27 is the connection target, and switching from the motor traveling mode to the engine traveling mode of the low-speed state is performed. However, of course, it is possible to perform switching from the motor traveling mode to the engine traveling mode of the high-speed state, and in this case, the dog clutch 28 is the connection target.

In step S203, when one of the first dog clutches 27 and 28 which is the connection target in the first switching mechanism 14 is disconnected most recently, information on the rotation phases of the first rotation shaft 4 and the third rotation shaft 9 stored in the storage unit 42a is acquired from the storage unit 42a, and the process proceeds to step S204.

In step S204, the rotation phases of the first rotation shaft 4 and the third rotation shaft 9 are adjusted and controlled by the engine 11 or the first motor generator 12, using the information on the rotation phase acquired in step S203, so that connection switching of the one of the dog clutches 27 and 28 which is the connection target can be performed, and the process proceeds to step S205.

Incidentally, the processes of step S203 and step S204 are the phase adjustment process 42e.

In step S205, the connection switching of the dog clutch 27 of the connection target is performed by the first actuator 29, and the process proceeds to step S206.

Incidentally, the process of step S205 corresponds to the connection process 42f, and also corresponds to the simultaneous connection process 42b of setting to the connected state of both the first switching mechanism 14 and the second switching mechanism 16.

In step S206, in order to use the relation of the rotation phase of the dog clutch 39 of the second switching mechanism 16 which is the target of disconnection switching at the time of the future connection switching, the rotation phase of the first rotation shaft 4 is detected by the first rotation phase detection unit 12a, the rotation phase of the third rotation shaft 9 is detected by the third rotation phase detection unit 13a, the information of these rotation phases is stored in the storage unit 42a, and the process proceeds to step S207.

Incidentally, the process of step S206 corresponds to the phase storage process 42c.

In step S207, disconnection switching of the dog clutch 39 which is the target of the disconnection switching is performed by the second actuator 41, the second switching mechanism 16 is in the state of cutting off the power, and the process is ended. In step S202, when the dog clutches 27 and 28 which are the connected targets in the first switching mechanism 14 are in the connected state, the process proceeds to step S206.

Figure 6:
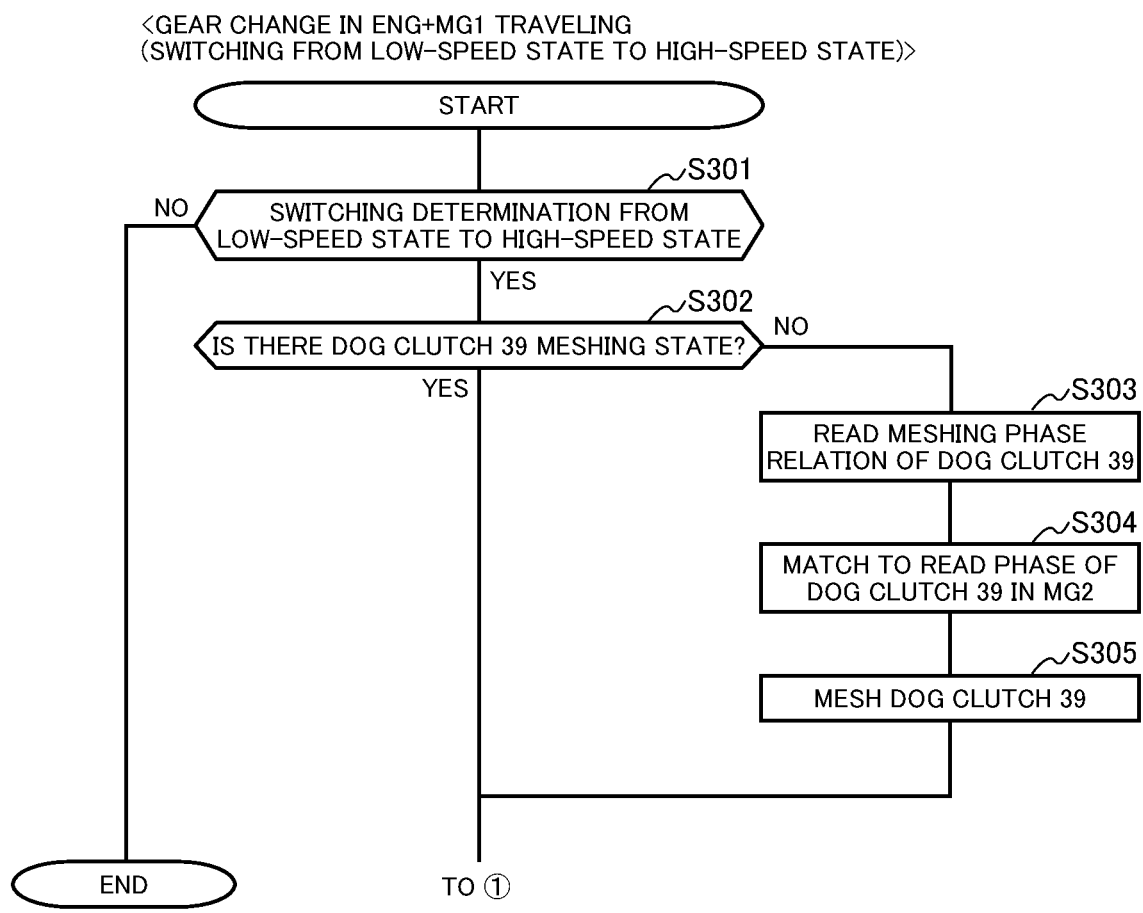
FIG. 6 is a flowchart illustrating a flow of a first half in a process at the time of gear change switching by a first switching mechanism.

FIG. 6 is a flowchart illustrating a first half of the flow of process at the time of gear change switching by the first switching mechanism, and FIG. 7 is a flowchart illustrating a second half of the flow of process at the time of gear change switching by the first switching mechanism. The processes illustrated in FIGS. 6 and 7 are periodically executed for each predetermined interval. The process starts from step S301. In step S301, it is determined whether there is a need for gear change switching from the low-speed state to the high-speed state. If there is no need for gear change switching, the process is ended. If there is a need for gear change switching, the process proceeds to step S302. Incidentally, at the time of the determination of step S301, information on the presence or absence of the shift command from the driver and the traveling state of the vehicle is also used.

In step S302, it is checked whether the dog clutch 39 of the second switching mechanism 16 is in the connected and disconnected state, and if it is in the disconnected state, the process proceeds to step S303. In step S303, when the dog clutch 39 is disconnected most recently, the information on the rotation phases of the first rotation shaft 4 and the third rotation shaft 9 stored in the storage unit 42a by the phase storage process 42c is acquired from the storage unit 42a, and the process proceeds to step S304.

In step S304, a control of adjusting the rotation phases of the first rotation shaft 4 and the third rotation shaft 9 is performed by the second motor generator 13 so that the dog clutch 39 can be connected and switched, using the information on the latest rotation phase acquired from the storage unit 42a in step S303, and the process proceeds to step S305.

Incidentally, the processes of step S303 and step S304 also correspond to the phase adjustment process 42e.

In step S305, the connection switching of the dog clutch 39 is performed by the second actuator 41, and the process proceeds to step S306.

Incidentally, the process of step S305 corresponds to the connection process 42f, and also corresponds to the simultaneous connection process 42b of setting the connected state of both the first switching mechanism 14 and the second switching mechanism 16.

In step S306, in the first switching mechanism 14, information on the phase relation at that time point is acquired by detection of the rotation phase of the first rotation shaft 4 by the first rotation phase detection unit 12a and detection of the rotation phase of the third rotation shaft 9 by the third rotation phase detection unit 13a, so that future connection switching of the dog clutch 27 which is the target of disconnection switching can be performed, the information is stored in the storage unit 42a, and the process proceeds to step S307.

Incidentally, the process of step S306 also corresponds to the phase storage process 42c.

In step S307, the disconnection switching of the target dog clutch 27 is performed by the first actuator 29, and the process proceeds to step S308.

Incidentally, the process of step S307 also corresponds to the disconnection process 42d.

In step S308, in the first switching mechanism 14, when the dog clutch 28 which is the target for performing the connection switching is disconnected most recently, the information on the rotation phases of the first rotation shaft 4 and the third rotation shaft 9 stored in the storage unit 42a by the phase storage process 42c is acquired from the storage unit 42a, and the process proceeds to step S309.

In step S309, the control of adjusting the rotation phases of the first rotation shaft 4 and the third rotation shaft 9 is performed by the engine 11 or the first motor generator 12 so that the target dog clutch 28 can be connected and switched, using the information on the latest rotation phase acquired from the storage unit 42a in step S308, and the process proceeds to step S310.

Incidentally, the processes of step S308 and step S309 also correspond to the phase adjustment process 42e.

In step S310, the connection switching of the target dog clutch 28 is performed by the first actuator 29, and the process proceeds to step S311. In step S311, the disconnection switching of the dog clutch 39 of the second switching mechanism 16 is performed, and the process is ended.

Incidentally, the process of step S311 is not essential and can also be omitted.

Further, in the same drawings, switching from the low-speed state to the high-speed state has been described as an example. However, even in switching from the high-speed state to the low-speed state, as long as the target of the disconnection switching and the target of the connection switching are reversed in the dog clutch 27 and the dog clutch 28, the same idea can be applied as it is.

According to the power transmission control device 1 configured as described above, since the connection and disconnection control of the dog clutches 27, 28, and 39 is performed, using a small number of sensors and using resolvers incorporated in the first motor generator 12 and the second motor generator 13, cost reduction can be easily achieved. Moreover, it is also easy to improve the accuracy sequentially by machine learning.

REFERENCE SIGNS LIST

1 Power transmission control device
4 First rotation shaft
8 Second rotation shaft
9 Third rotation shaft
11 Engine (first power source)
12 First motor generator (first power source)
12a First rotation phase detection unit
13 Second motor generator (second power source)
13a Third rotation phase detection unit
14 First switching mechanism
16 Second switching mechanism
42 Control unit
42a Storage unit

The invention claimed is:
1. A power transmission control device comprising:
a first rotation shaft;
a first power source provided to be able to adjust a rotation speed of the first rotation shaft;
a second rotation shaft which rotates in conjunction with an axle;

a first switching mechanism which performs connection and disconnection switching of power transmission between the first rotation shaft and the second rotation shaft;

a third rotation shaft different from the first rotation shaft and the second rotation shaft;

a second power source provided to be able to adjust a rotation speed of the third rotation shaft;

a second switching mechanism which performs connection and disconnection switching of power transmission between the third rotation shaft and the second rotation shaft;

a control unit which controls connection and disconnection switching operation of the first switching mechanism and the second switching mechanism and operations of the first power source and the second power source;

a storage unit;

a first rotation phase detection unit which detects a rotation phase of the first rotation shaft; and a third rotation phase detection unit which detects a rotation phase of the third rotation shaft, wherein at least one switching mechanism of the first switching mechanism and the second switching mechanism is a dog clutch type, and the control unit performs a simultaneous connection process of operating to switch both the first switching mechanism and the second switching mechanism to a connected state when releasing the connection of the at least one switching mechanism, a phase storage process of storing the rotation phase of the first rotation shaft detected by the first rotation phase detection unit and the rotation phase of the third rotation shaft detected by the third rotation phase detection unit in the storage unit, after executing the simultaneous connection process, and a disconnection process of operating to switch the at least one switching mechanism to a disconnected state, while maintaining at least the other switching mechanism in the connected state, after executing the phase storage process.

2. The power transmission control device according to claim 1, wherein the control unit performs a phase adjustment process of controlling the first power source or the second power source on the basis of the rotation phase of the first rotation shaft and the rotation phase of the third rotation shaft stored in the storage unit by the phase storage process to adjust the rotation phase of the first rotation shaft and the rotation phase of the third rotation shaft, when the at least one switching mechanism is switched from the disconnected state to the connected state, and a connection process of connecting the at least one switching mechanism after executing the phase adjustment process.

* * * * *